(12) United States Patent
Wilson

(10) Patent No.: US 10,435,605 B2
(45) Date of Patent: Oct. 8, 2019

(54) ADDITIVES FOR WET HEATING AND COOLING SYSTEMS

(71) Applicant: Endo Enterprises (UK) Ltd, Warrington (GB)

(72) Inventor: Robert Wilson, Bearsden (GB)

( * ) Notice: Subject to any disclaimer, the term of this patent is extended or adjusted under 35 U.S.C. 154(b) by 82 days.

(21) Appl. No.: 15/549,684

(22) PCT Filed: Feb. 9, 2016

(86) PCT No.: PCT/GB2016/050291
§ 371 (c)(1),
(2) Date: Aug. 9, 2017

(87) PCT Pub. No.: WO2016/128724
PCT Pub. Date: Aug. 18, 2016

(65) Prior Publication Data
US 2018/0037787 A1    Feb. 8, 2018

(30) Foreign Application Priority Data

Feb. 9, 2015 (GB) .................................. 1502131.4

(51) Int. Cl.
| | |
|---|---|
| *C09K 5/04* | (2006.01) |
| *C09K 5/10* | (2006.01) |
| *F24D 3/02* | (2006.01) |
| *F24D 19/00* | (2006.01) |
| *F25B 39/00* | (2006.01) |
| *F25B 45/00* | (2006.01) |

(52) U.S. Cl.
CPC ............. *C09K 5/048* (2013.01); *C09K 5/041* (2013.01); *C09K 5/10* (2013.01); *F24D 3/02* (2013.01); *F24D 19/0092* (2013.01); *F25B 39/00* (2013.01); *F25B 45/00* (2013.01)

(58) Field of Classification Search
CPC ........ F24D 3/02; F24D 19/0092; F25B 30/00; F25B 45/00; C09K 5/048; C09K 5/041; C09K 5/10; C09K 5/00
See application file for complete search history.

(56) References Cited

U.S. PATENT DOCUMENTS

| | | | |
|---|---|---|---|
| 2004/0206941 | A1 | 10/2004 | Gurin |
| 2008/0302998 | A1* | 12/2008 | Hong .................. C09K 5/10 252/74 |
| 2011/0033719 | A1* | 2/2011 | Su ..................... C23F 11/145 428/457 |

FOREIGN PATENT DOCUMENTS

| | | |
|---|---|---|
| CN | 104232028 A | 12/2014 |
| GB | 2 423 077 A | 8/2006 |
| JP | 2000 313872 A | 11/2000 |
| WO | WO 02/02727 A1 | 1/2002 |

OTHER PUBLICATIONS

International Search Report and Written Opinion dated May 25, 2016 in related International Patent Application No. PCT/GB2016/050291.
International Preliminary Report on Patentability dated Aug. 15, 2017 in related International Patent Application No. PCT/GB2016/050291.
Search Report dated Mar. 23, 2015 by the UK Intellectual Property Office in related Patent Application No. GB1502131.4.

* cited by examiner

*Primary Examiner* — Elizabeth J Martin
(74) *Attorney, Agent, or Firm* — Eric L. Lane; Green Patent Law

(57) ABSTRACT

A surfactant suitable for use as an additive in the heat transfer liquid of a heating and/or cooling system, wherein the surfactant comprises a coconut-derived surfactant, the preferred coconut-derived surfactant being a non-ionic, coco-glucoside. The surfactant can be used as an additive in a heat transfer fluid of a wet central heating system or a chiller circuit at a concentration of between 800 ppm and 1500 ppm, but preferably 1200 ppm, as this has surprisingly been found to yield an optimum reduction in the surface tension of the heat transfer fluid, whilst not significantly or appreciably increasing the specific heat capacity of the heat transfer fluid.

14 Claims, No Drawings

ADDITIVES FOR WET HEATING AND COOLING SYSTEMS

DESCRIPTION

This invention relates to additives for wet heating and cooling systems, and in particular, but without limitation, to additives that can be added to the water of domestic or commercial central heating systems or to the coolant of air conditioning systems. In certain embodiments, the addition of the additive improves the thermal efficiency of the heating or cooling system overall.

The rapid rise in energy costs has led to a number of energy improvement chemicals and heat modifiers for heating systems appearing on the market. Some of these have been supported by a few case histories, but there is little scientific evidence to indicate why these products work or indeed if they work.

It is known to use additives in wet central heating systems to guard against sludging and corrosion and to alter the thermal properties of the heat transfer liquid (i.e. water in most domestic or commercial central heating systems). The accepted wisdom in the art suggests that the addition of certain additives has the effect of reducing nucleate boiling of the liquid, which in turn increases the efficiency of heat transfer in a heat exchanger system (either at the boiler/chiller, or in a radiators/condensers). For example, certain studies seem to indicate that changing the nucleate boiling properties of water, by the addition of surfactant additives, can improve the thermal properties of water used in heating systems.

Thus, known additives for heating and/or cooling systems have been designed to suppress nucleate boiling. These known substances tend to change the form of nucleate boiling rather than the intensity. A surfactant reduces the bubble size and therefore the flow of heat (larger surface area.). This does not change energy requirements, but reduces boiler noise.

However, work by others has shown that nucleate boiling is not responsible for energy saving in closed heating systems and therefore, because the underlying rationale is incorrect, the focus of recent research in this area has often been misdirected. As a result, whilst known additives have sometimes been found to exhibit small improvements in thermal efficiency, the limits of what is possible, based on existing assumptions, are rapidly being reached. A need therefore exists for a new and/or improved and/or alternative additive for the heat transfer liquid of heating and/or cooling systems, which overcomes one or more of the above problems, and/or which improves the thermal efficiency of such systems.

Various aspects of the invention are set forth in the appendent claims.

According to an aspect of the invention, there is provided a heat transfer fluid suitable for use in a wet heating and/or cooling system, comprising water plus substantially 800 ppm to substantially 1500 ppm coconut-derived surfactant, the coconut-derived surfactant being non-ionic, coco-glucoside—a non-ionic tenside derived from coconut oil.

Suitably, the coconut-derived surfactant comprises a non-ionic or cationic surfactant solution that, when added to water in relatively low concentrations, significantly modifies some of its key properties.

One of the key aspects of the invention is the selection of a coconut-based surfactant for use as an additive in central heating and cooling systems.

It will be appreciated that there are several competing requirements, namely a requirement for a chemical that is compatible with central heating and cooling systems; one that is biodegradable; one that is non-toxic; one that exhibits a surface tension-reducing effect; one that reduces the specific heat capacity of the heat transfer fluid. Whilst some of these requirements are met by known additives to varying degrees the use of a coconut-based surfactant has been identified as being particularly effective.

Surprisingly, the use of a coconut-derived surfactant has been found to result in an unexpected, and significant, reduction in the heat capacity of water to which it has been added, compared with known non-coconut-derived surfactants. The invention has been found to reduce the amount of energy required to heat, cool or evaporate water treated with it. Natural products, such as coconut oil, are inherently biodegradable, and because coconut is a foodstuff, it is also inherently non-toxic. What is surprising is that the rate of biodegradation of this natural product is sufficiently slow for it to be useful in a heating/cooling system for so long. The reason for this is believed to be the lack of oxygen and/or the necessary bacteria for aerobic digestion in-situ. However, when the surfactant is discharged to waste, digestion/biodegradation is readily achieved by the bacteria present in sewerage systems and wastewater treatment plants. Further, because the surfactant is based on natural ingredients, it does not materially affect the sewerage/wastewater treatment system, unlike most manmade surfactants.

In addition, it has surprisingly been found that coconut-based surfactants are stable in thermally-cycled systems, such as heating/cooling systems, which finding flies in the face of against accepted wisdom in the art, which dictates the use of engineered, or man-made chemicals to withstand thermal cycling and avoid breakdown of the structure of the surfactant.

Further, that the surface tension- and specific heat capacity-reducing properties of coconut-based surfactants are so well-aligned with the requirements of a central heating or cooling additive is highly surprising. Therefore, whilst it is known to use surfactants to reduce surface tension of water, coconut-based surfactants have hitherto been discounted or contraindicated due to their perceived short longevity. Further, whereas an object of known additives has been to increase the specific heat capacity of the heat transfer fluid, the invention seeks to reduce the specific heat capacity of the thermal transfer fluid. This is clearly contraindicated by the prior art, which seeks to store as much thermal energy in the heat transfer fluid as possible, whereas the invention, by stark contrast, is more concerned with elevating the radiator temperature or suppressing the cooling element's temperature.

Suitably, the coconut-derived surfactant comprises a non-ionic, coco-glucoside. Suitably, the non-ionic coco-glucoside is added to water at a relatively low concentration.

The relatively low concentration is substantially 800 ppm to substantially 1500 ppm.

Suitably, the addition of the invention in the aforementioned concentrations reduces the specific heat capacity of the solution (i.e. water+surfactant) by 10% to 12% compared with pure water.

Suitably, the addition of the surfactant of the invention in the aforementioned concentrations reduces the surface tension of the solution (i.e. water+surfactant) by 60% to 70%, compared with pure water. Suitably, the addition of the surfactant breaks the hydrogen bonding of the water, which may allow much greater penetration of heat transfer surfaces and increase the effective heat transfer surface area of a radiator or a fan coil where there is water/air heat exchange.

Suitably, the surfactant is non-corrosive. This may improve the longevity of a heating/cooling system to which it has been added.

Suitably, the surfactant is biodegradable. This may reduce the environmental impact of its use.

Suitably, the addition of the surfactant reduces noise in a heating/cooling system to which it has been added, which may reduce noise pollution and/or minimize the kettling effect in boilers.

Another aspect of the invention provides a heat transfer fluid suitable for use in a wet central heating system or a chiller circuit, comprising water plus substantially 800 ppm to substantially 1500 ppm, and preferably to 1200 ppm coconut-derived surfactant.

The aforementioned range of concentrations is not arbitrary: it has been found, surprisingly, to yield an optimum change in the surface tension to achieve the objects of the invention, whilst not significantly or appreciably increasing the specific heat capacity of the heat transfer fluid. In experiments, it has been noted that higher concentrations (than the preferred range) have been found to unacceptably increase the specific heat capacity of the heat transfer fluid; and lower concentrations (then the preferred range) have been found to not yield the desired surface tension reduction.

Another aspect of the invention provides a heat transfer fluid suitable for use in a wet central heating system or a chiller circuit, comprising water and substantially 1 wt. % coconut-derived surfactant.

Suitably, the coconut-derived surfactant comprises non-ionic or cationic tenside derived from coconut oil.

Another aspect of the invention provides a central heating water additive comprising water and a coconut-derived surfactant, wherein the concentration of surfactant in the additive is such that, when a first specified amount of additive is added to a central heating system containing a second specified amount of heat water, the concentration of the surfactant within the central heating system is substantially 800 ppm to substantially 1500 ppm, and preferably to 1200 ppm.

Another aspect of the invention provides a central heating water additive comprising water and a coconut-derived surfactant, wherein the concentration of surfactant in the additive is up to, or substantially 12%.

The selection of 9%-15% surfactant in the additive is particularly beneficial because at concentrations of less than 10%, a container for the additive can be disposed of in domestic waste bins. At concentrations of greater than 10%, the used containers might, in certain jurisdictions, need to be recovered and/or recycled separately as industrial waste. Thus, keeping the concentration of surfactant below 10% is beneficial as it facilitates the disposal and/or recycling of used containers for the additive.

Further, by providing the additive in containers at 10% concentration, dosing central heating system or chiller to the preferred 1200 ppm level is greatly facilitated. For example, the additive could be provided with directions to add one liter of additive (at 10% concentration) to every one-hundred liters of heat transfer fluid, thus resulting in a concentration in the system of 1000 ppm. However, as a user is unlikely to under-dose a system, or discard the remainder of a part-used container in most situations (e.g. 1½ containers needed for a 150 liter system, so there would be ½ liter remaining in a second container if correctly dosed), in practice, however, the actual dosage will generally be higher than the 1000 ppm specified, thus resulting in the preferred ~1200 ppm concentration.

An aspect of the invention therefore provides a method of dosing the heat transfer fluid of a central heating or chiller system comprising the step of adding substantially 1 liter of additive as described herein to every 100 l of heat transfer fluid in the central heating or chiller system.

A further aspect of the invention provides a wet central heating system comprising a boiler, a radiator and pipes interconnecting the boiler and radiator; and a heat transfer fluid adapted, in use, to circulate through the boiler, radiator and pipes, wherein the heat transfer fluid comprises water and a coconut-based surfactant as herein described.

A yet further aspect of the invention provides a chiller system comprising a condenser, an evaporator and pipes interconnecting the condenser and evaporator; and a heat transfer fluid adapted, in use, to circulate through the condenser, evaporator and pipes, wherein the heat transfer fluid comprises water and a coconut-based surfactant as described herein.

Suitably, the central heating or chiller system comprises substantially 800 ppm to substantially 1500 ppm surfactant, and preferably substantially 1200 ppm surfactant.

Another aspect of the invention provides a method of dosing the heat transfer fluid of a central heating or chiller system comprising the step of: adding a coconut-based surfactant as described herein to obtain a concentration of said surfactant of between substantially 800 ppm and substantially 1500 ppm, and preferably substantially 1200 ppm, in the heat transfer fluid.

Embodiments of the invention shall now be described, by way of example only, with reference to the following examples:

Tests have been performed to assess the efficacy of the invention when added to water in a central heating system, and when added to water in a cooling system. For the sake of reference, 1% by weight of the surfactant of the invention was added to water and the effect of so doing is illustrated in the property table (Table 1) below:

TABLE 1 properties of water, and water treated with 1% of surfactant in accordance with the invention.

| Parameter | Water | Water + 1 wt. % non-ionic tenside derived from coconut oil | Difference compared with water (%) |
|---|---|---|---|
| Surface Tension (mN/m) | 59.85 | 24.48 | −59.1 |
| Density | 0.962 | 0.9764 | 1.5 |
| Viscosity (cp) | 0.29 | 0.20 | −32.7 |
| Thermal conductivity W/m · K) | 0.678 | 0.522 | −23 |
| Specific Heat capacity (J/g° C.) | 4.2 | 3.8 | −9.8 |

From the foregoing, it will be appreciated that the addition of even 1% non-ionic surfactant derived from coconut oil can change the properties of normal water by significant amounts. In particular, and with regard to heating and cooling systems, the parameters of interest are principally the specific heat capacity and the surface tension.

In a heating system, the energy required to heat the water circulating in the heating circuit is the mass flow of water multiplied by its specific heat capacity. The amount of energy required to take the water to its target temperature (typically around 80° C.) has been found to be 9.8% less with water treated with the invention, that with untreated water.

The corollary to this, of course, is that whilst the temperature of both the treated and untreated water may be around 80° C. in both cases, the water treated with the invention contains less heat energy than untreated water. In theory, therefore, ought to be less heat available in the treated water, which can be used as useful output heat, e.g. at the radiators, or at the fan coils, in a heating system.

The equation that dictates the amount of energy which can be transmitted into a space from a radiator circuit is described by the equation:

$$Q = U \cdot A \cdot \Delta T \quad \text{(Equation 1)}$$

Where:
Q=energy transmitted;
U=the overall heat transfer coefficient of the radiator;
A=the surface area through which the heat is transmitted; and
ΔT=the temperature difference between the radiator surface and the air in the room (typically 50° C.)

The addition of the invention has a marginal impact on the overall heat transfer coefficient and cannot change the temperature difference, so the energy transmitted is proportional to effective surface area, that is to say:

$$Q \propto A \quad \text{(Equation 2)}$$

Untreated water has a relatively high surface tension (cf. Table 1) because of its hydrogen bonding, which links water molecules together. These weak bonds (Van der Waals forces) mean that water presents itself to a surface as a sphere, and thus water does not "wet" the surface effectively.

When the additive of the invention, however, is added to water, the surface tension is reduced by almost 60%, thus breaking some or all of the weak bonds and increasing the wettability of the water so treated. The overall effect of this is that the effective surface area reached by the water is much greater than by ordinary water, that is to say:

$$\dot{A} = f(w) \cdot A \quad \text{(Equation 3)}$$

Where:
Å=the effective surface area;
f(w)=is a function of the wettability, w, of the water; and
A=the actual, measured surface area of the radiator.
Thus, Equation 2 becomes:

$$Q \propto \dot{A} \quad \text{(Equation 4)}$$

And given that Å>A, where the water is treated with a surfactant in accordance with the invention, the heat transfer efficiency of a central heating system, whose water has been treated with a surfactant in accordance with the invention, is greatly improved.

Test results indicate that the addition of a surfactant in accordance with the invention can give rise to an average of a 10% reduction in energy use in a heating system, suggesting that the effective surface area Å is increased by 11%, according to equations (1), (3) and (4) above.

$$Q = U \cdot A \cdot \Delta T \quad \text{(Equation 1)}$$

$$\therefore \dot{A} = 1 \cdot 11 \cdot A \quad \text{(Equation 5)}$$

$$\therefore 0.9 Q = U \cdot \dot{A} \cdot \Delta T = U \cdot 1 \cdot 11 \cdot A \cdot \Delta T \quad \text{(Equation 6)}$$

This means that a system using the invention requires much less energy than a system operating on ordinary water. It is also likely that, in radiators which are scaled or corroded, the invention might realize an even greater energy saving as more effective surface area Å may be exposed due to the increased wettability of such surfaces by the invention.

In a chiller circuit, the objective is to absorb heat energy from a room via heat exchangers that function similarly to the radiators described above. The same reasoning applies mutatis mutandis to chiller systems and similar efficiency improvements are observed, because treated water is able to absorb heat from the room more quickly due to its lower specific heat capacity and because it wets the surfaces of the heat exchanger better due to its lower surface tension.

Further, because water in a chiller circuit tends to contain a glycol-based antifreeze (e.g. ethylene glycol), due to the structural and/or chemical similarities between glycol and the coconut-derived surfactant of the invention, there is a synergy here (i.e. in terms of reducing surface tension), which results in an unexpected improvement in cooling efficiency, even at lower concentration of the invention. As a result, energy savings in chiller systems containing water treated with glycol and the surfactant of the invention have been found to exhibit an unexpectedly greater improvement in cooling efficiency than pure water, or water+glycol mixtures. The overall result is an energy saving because, for a given required temperature drop in a room, the compressor of a chiller circuit treated with the invention may need to run less often.

It will be readily apparent from the foregoing that possible advantages of the invention may include: requiring 10%-12% less energy to heat water treated with it to 80° C. in a heating boiler than ordinary water; requiring 10% to 12% less energy to cool water treated with it to 4° C. in a chiller plant than ordinary water; increasing the effective heat transfer surface area of a radiator or fan coil or any water/air heat exchanger by 20-40%; inherent biodegradability due to the additive's coconut base. As such, system contents could be discharged into public sewers with minimal adverse effects on the environment; the use of a coconut-based surfactant has greater long term thermal stability, in some cases lasting for 3 years in a heating or cooling system; compatibility with the materials normally found in heater and chiller system, such as copper, steel, cast iron, lead, plastics, sealing greases, adhesives, elastomeric gaskets and seals etc.; and/or compatibility with other chemical additives (especially glycol) currently used in heating and chiller systems.

The invention is not restricted to the details of the foregoing embodiments, which are merely exemplary of the invention.

The invention claimed is:

1. A heat transfer fluid suitable for use in a wet heating or cooling system, comprising water plus 800 ppm to substantially 1500 ppm of a coconut-derived surfactant, the coconut-derived surfactant being non-ionic, coco-glucoside.

2. The heat transfer fluid of claim 1, further comprising glycol.

3. The heat transfer fluid of claim 2, comprising ethylene glycol.

4. The heat transfer fluid of claim 1, wherein the coconut-derived surfactant is non-corrosive.

5. The heat transfer fluid of claim 1, wherein the coconut-derived surfactant is biodegradable.

6. The heat transfer fluid of claim 1, comprising water plus 1200 ppm of the coconut-derived surfactant.

7. The heat transfer fluid of claim 1, wherein the heat transfer fluid comprises 1200 ppm of the coconut-derived surfactant.

8. A method of dosing the heat transfer fluid of a central heating or chiller system comprising the step of: adding a surfactant according to claim 1.

9. A method of dosing the heat transfer fluid of a central heating or chiller system comprising the step of: adding the coconut-derived surfactant according to claim 1, to obtain a concentration of the coconut-derived surfactant of 1200 ppm in the heat transfer fluid.

10. A central heating water additive comprising water and the coconut-derived surfactant according to claim 1, wherein the concentration of the coconut-derived surfactant in the additive is such that, when the additive is added to a central heating system containing hot water, the coconut-derived concentration of the surfactant within the central heating system is 800 ppm to 1500 ppm.

11. The central heating water additive of claim 10, wherein the concentration of the coconut-derived surfactant in the additive is 12%.

12. The central heating water additive of claim 11 wherein 1 liter of additive is provided for every 100 liters of heat transfer fluid.

13. A central heating water additive comprising water and the coconut-derived surfactant according to claim 1, wherein the concentration of the coconut-derived surfactant in the additive is such that, when the additive is added to a central heating system containing hot water, the concentration of the coconut-derived surfactant within the central heating system is 1200 ppm.

14. The central heating water additive of claim 13, wherein the concentration of the coconut-derived surfactant in the additive is 12%.

\* \* \* \* \*